United States Patent [19]

Taylor et al.

[11] Patent Number: 4,831,297

[45] Date of Patent: May 16, 1989

[54] SUBMERSIBLE ELECTRIC PROPULSION MOTOR WITH PROPELLER INTEGRATED CONCENTRICALLY WITH MOTOR ROTOR

[75] Inventors: Owen S. Taylor; Jeffrey R. Repp, both of Penn Township, Westmoreland County; Donald W. Brown, Monroeville, all of Pa.

[73] Assignee: Westinghouse Electric Corp., Pittsburgh, Pa.

[21] Appl. No.: 156,044

[22] Filed: Feb. 16, 1988

[51] Int. Cl.[4] ............................................. H02K 5/12
[52] U.S. Cl. ...................................... 310/87; 440/6; 440/38; 417/356
[58] Field of Search ................... 310/87, 89, 90, 63; 440/6, 38; 417/355, 356, 423 R

[56] References Cited

U.S. PATENT DOCUMENTS 4,459,087  7/1984  Barge ................................. 417/356

FOREIGN PATENT DOCUMENTS 917475   9/1954  Fed. Rep. of Germany ........ 310/87
1072804  6/1967  United Kingdom .................. 310/87
1439806  6/1976  United Kingdom .................. 310/87

*Primary Examiner*—Patrick R. Salce
*Assistant Examiner*—Judson H. Jones

[57] ABSTRACT

A submersible electric propulsion motor includes a sealed cylindrical stator housing defining a central flow passage and a cylindrical rotor core disposed within the stator housing passage such that the stator housing encompasses the rotor core. The rotor core defines a center flow opening which communicates with inlet and outlet ends of the stator housing passage. The motor also includes a propulsion propeller having a plurality of radial blades and a central cylindrical hub. The propeller is disposed within and across the rotor core opening with its periphery being rigidly connected to the rotor core. A support structure has end portions disposed at and rigidly attached to the stator housing inlet and outlet ends, and an axial portion which extends axially through the stator housing passage and rotor core opening and is rigidly attached to the radial portions. A cylindrical bearing is disposed about the support structure axial portion within the rotor core opening between the axial portion and the propeller hub and mounts the propeller and rotor core rigidly attached thereto for rotation relative to the support structure and the stator housing. Electrical power cables emanate from the stator housing through the support structure end and axial portions to the motor exterior for connection to a source of electrical power.

10 Claims, 5 Drawing Sheets

SUBMERSIBLE ELECTRIC PROPULSION MOTOR WITH PROPELLER INTEGRATED CONCENTRICALLY WITH MOTOR ROTOR

CROSS REFERENCE TO RELATED APPLICATION

Reference is hereby made to the following copending application dealing with related subject matter and assigned to the assignee of the present invention: "Submersible Electric Propulsion Motor With Shaftless Integrated Propeller And Motor Rotor" by Owen S. Taylor, assigned U.S. Ser. No. 156,045 and filed 2/16/88.

BACKGROUND OF THE INVENTION

1. Field of the Invention

The present invention relates generally to electric drive systems for marine vehicles and, more particularly, is concerned with a submersible electric propulsion motor which incorporates the propulsion propeller concentrically within the rotor of the electric motor.

2. Description of the Prior Art

Most drive systems for marine vehicles use a propeller driven by a rotating power source through some drive train arrangement which extends between the propeller and the rotating power source, such as internal combustion engines, turbines and electric motors. In many cases the drive train arrangement uses gears to match the speed-torque characteristics of the power source and the propeller. The propeller must be in the water, whereas the rotating power source is mostly dry and seals are used about drive train components to keep water in the propeller area away from the rotating power source area.

One of the problems associated with the above-described arrangement is the lack of drive system layout flexibility. This is particularly true for large ships where the propeller power is in the thousands of horsepower range. The propeller location dictates a great deal of the drive train location. Conventional electric drive systems offer some flexibility, since the prime mover and generator can be remotely located away from the propeller. However, the electric motor still must be directly tied to the propeller through a shaft.

Also, conventional marine vehicle propeller systems generally offer only forward and reverse thrust, since the propeller shaft is fixed. The exception to this is conventional outboard drives used primarily on pleasure crafts. These conventional outboard drives allow the propeller, shaft and gear assembly, and the rotating power source to move in a plane parallel to the surface of the water and thereby produce directional thrust. However, these conventional outboard drives are unsuitable for high power, quiet, and/or submerged military uses.

Consequently, a need exists for an electric drive system which will eliminate the above-described problems associated with conventional marine vehicle drives while, at the same time, adopt the maneuverability of conventional outboard drives.

SUMMARY OF THE INVENTION

The present invention provides a submersible electric propulsion motor designed to satisfy the aforementioned needs. The motor employs a rotor concentrically arranged around and rigidly connected to a propeller such that both are mounted for rotation together relative to a stationary stator housing which circumscribes the rotor housing. This arrangement requires no external shafting, no gears, and can be configured to apply thrust during operation in any direction. The present invention allows substantially greater flexibility in boat design, since the propulsion system can easily be located at any convenient location with flexible electric power cables used to supply power. The motor can be provided in a gimballed end- or side-mounted relationship on the marine vehicle. The corrosive aspects and electrical conductivity of salt water are avoided by providing the stator core and windings and rotor core in sealed housings. However, direct contact of the stator and rotor housings with the fluid flow through the motor yields good heat transfer from the motor to the fluid. Other advantages of the motor is reduced noise, higher reliability and lower cost.

Accordingly, the present invention is directed to a submersible electric propulsion motor which comprises: (a) a sealed annular stator housing enclosing an annular stator core and windings and defining a central fluid flow passage therethrough being circumscribed by the stator housing and having opposite flow inlet and outlet ends; (b) a sealed annular rotor housing enclosing a rotor core and being disposed within the passage of the stator housing such that the stator housing circumscribes the rotor housing, the rotor housing defining a center fluid flow opening therethrough communicating with the inlet and outlet ends of the passage of the stator housing; (c) a propulsion propeller having a plurality of blades and a central annular hub, the propeller being disposed within and across the opening of the rotor housing and rigidly connected at its periphery to the rotor housing; and (d) a rigid support structure having an end portion disposed at the inlet end of the passage and rigidly attached to the stator housing and extending generally radially inward therefrom and an axial portion rigidly attached to the end portion and extending therefrom axially through the passage and opening of the respective stator and rotor housings, the hub of the propeller being mounted to the axial portion so as to mount the propeller and rotor housing attached thereto for rotation relative to the stator housing.

More particularly, the motor includes a vehicle attachment member defined on one of the support structure and the stator housing. For instance, the vehicle attachment member can be a flange defined on the support structure at the location of rigid attachment of the end portion to the axial portion thereof. The motor also includes electrical power conductor leads connected to the stator windings in the stator housing and emanating therefrom through the support structure to the exterior of the motor for connection to a source of electrical power. The attachment flange has a bore defined therein through which the conductor leads emanate from the support structure to the exterior of the motor.

Further, the motor includes an annular bearing disposed about the axial portion of the support structure within the opening of the rotor housing between the support structure axial portion and the hub of the propeller so as to mount the propeller and rotor housing rigidly attached thereto for rotation relative to the support structure and the stator housing. Also, the end portion of the support structure includes a plurality of elongated vanes arranged in a spider-like configuration.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figures 1, 2:
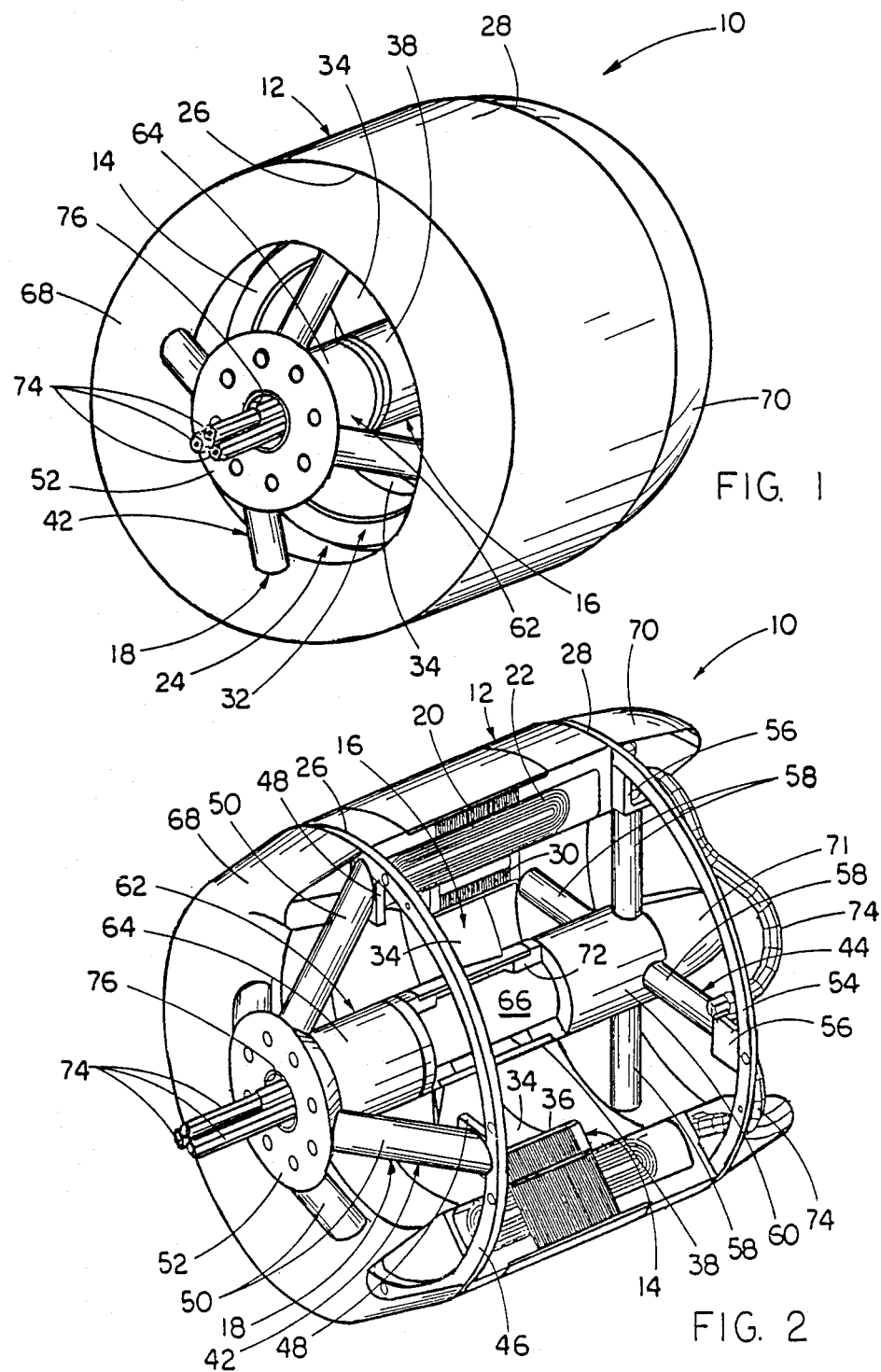
FIG. 1 is a perspective view of a submersible electric propulsion motor constructed in accordance with the principles of the present invention.
FIG. 2 is another perspective view of the motor of FIG. 1 with portions broken away to expose the components thereof.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, there is shown a submersible electric propulsion motor, generally designated by the numeral 10 and constituting a preferred embodiment of the present invention. In its basic components, the electric propulsion motor 10 includes a stator container or housing 12, a rotor container or housing 14, a propeller 16 and a support structure 18.

More particularly, the stator housing 12 is annular or cylindrical in shape, encloses an annular or cylindrical stator core 20 and windings 22, and is sealed and filled with oil. The stator housing 12 defines a central circular fluid flow passage 24 therethrough having opposite flow inlet and outlet ends 26, 28. The rotor housing 14 preferably is sealed, annular or cylindrical in shape, encloses an annular or cylindrical rotor core 30, and is disposed within the flow passage 24 of the stator housing 12 such that the stator housing 12 circumscribes the rotor housing 14. The rotor housing 14 defines a center circular fluid flow opening 32 therethrough which communicates with the inlet and outlet ends 26, 28 of the stator housing 12 and its central flow passage 24.

The propulsion propeller 16 of the electric propulsion motor 10 is integrated with the rotor housing 14 such that both form a single component of the motor being rotatable relative to the stationary stator housing 12. In particular, the propeller 16 is composed of a plurality of radial propeller blades 34, a cylindrical peripheral shroud 36 and a central cylindrical hub 38. The blades 34 extend between and are rigidly and integrally connected to the interior of the shroud 36 and the exterior of the hub 38. The propeller 16 is disposed within and across the opening 32 of the rotor housing 14 and rigidly connected at a flange 40 on its shroud 36 to the upstream end of the rotor housing 14.

The support structure 18 of the electric propulsion motor 10 is composed of upstream and downstream end portions 42, 44 disposed at the respective inlet and outlet ends 26, 28 of the passage 24 and stator housing 12. The upstream end portion 42 has an outer circular rim 46 with inwardly projecting square-shaped tabs 48 and a plurality of elongated tubular vanes 50 arranged in a spider-like configuration and rigidly fixed to the tabs 48. The vanes 50 extend radially inwardly and upstream from the outer rim 46 and are rigidly connected to a common disk-shaped flange 52 which also can function as the means for attaching the electric propulsion motor 10 to a marine vehicle. The upstream end potion 42 of the support structure 18 is rigidly attached by suitable fasteners (not shown) at its outer rim 46 to the upstream facing edge of the stator housing 12 The downstream end portion 44 also has an outer circular rim 54 with angle tabs 56 projecting inwardly and downstream thereof and a plurality of elongated tubular vanes 58 arranged in a spider-like configuration and rigidly fixed to the tabs 56. The vanes 58 extend radially inwardly from the outer rim 54 and are rigidly connected to a common hollow central hub 60. The downstream end portion 44 of the support structure 18 is rigidly attached by suitable fasteners (not shown) at its outer rim 54 to the downstream facing edge of the stator housing 12.

Figure 3:
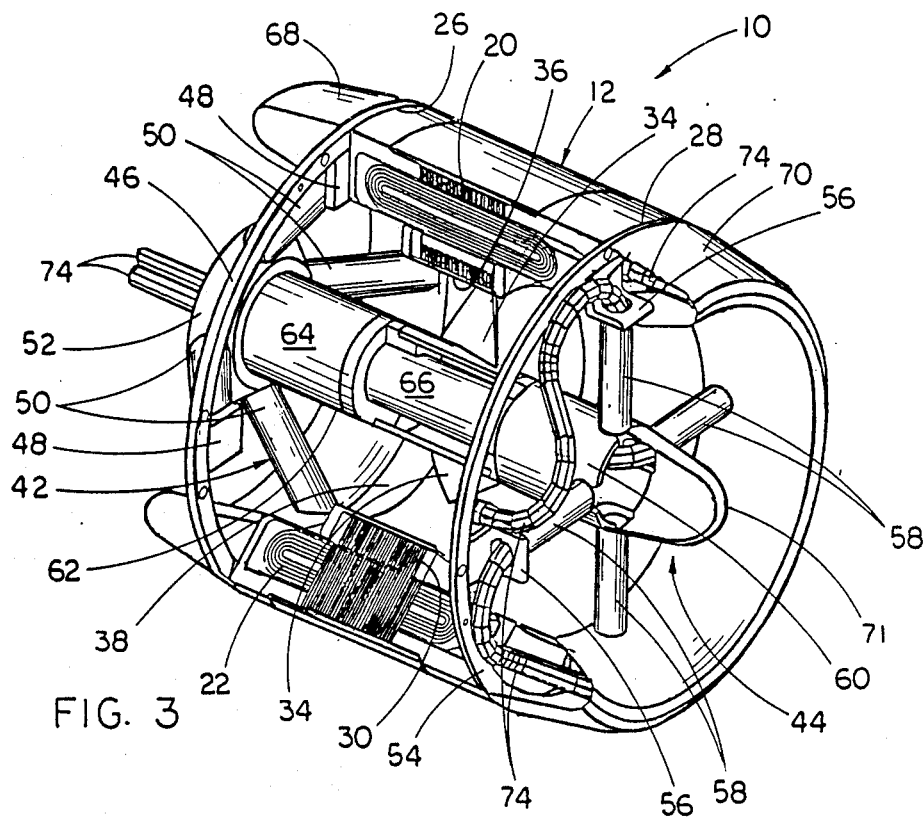
FIG. 3 is still another perspective view of the motor of FIG. 1, with portions broken away to expose the components thereof.
Figure 4:
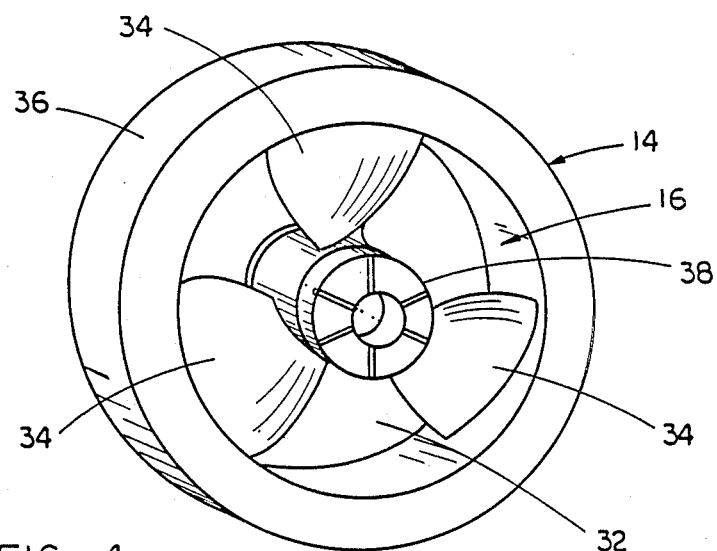
FIG. 4 is an enlarged perspective view of an integrated propeller and motor rotor component removed from the motor of FIG. 1.
Figure 5:
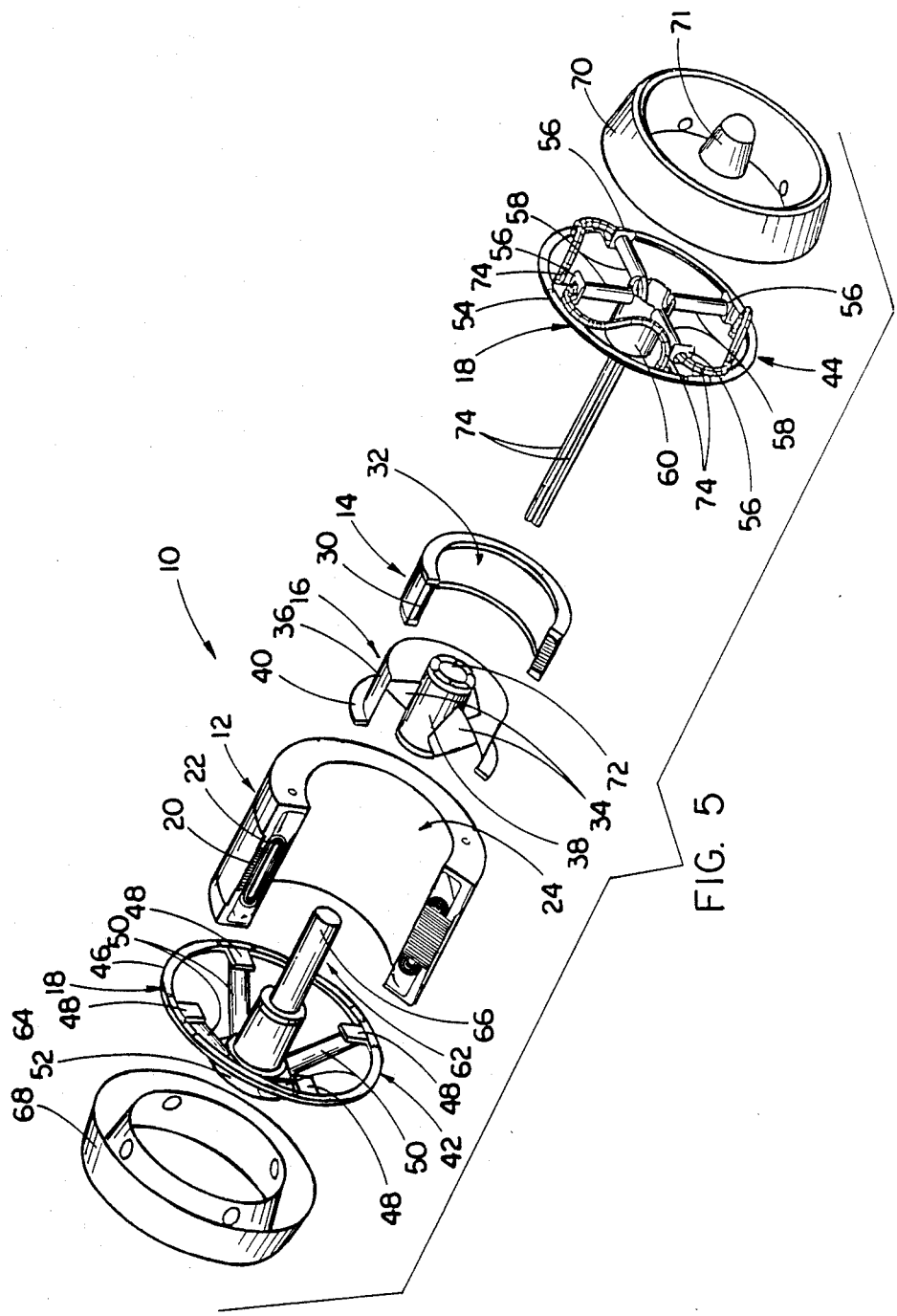
FIG. 5 is a perspective exploded view of the components of the motor of FIG. 1, on a somewhat smaller scale.

The support structure 18 of the electric propulsion motor 10 is also composed of an axial portion 62 which extends axially through the stator housing passage 24 and rotor housing opening 32. The axial portion 62 includes an upstream hollow cylindrical hub 64 rigidly fixed to the downstream face of the central flange 52 on the upstream end portion 42 of the support structure 18 and a downstream hollow shaft 66 rigidly fixed to the upstream hub 64 and sized to slidably fit within the central hub 60 on the downstream end portion 44 of the support structure 18. The shaft 66 is smaller in diameter than that of the upstream hub 64 and downstream central hub 60, with the diameters of the latter being substantially the same as the diameter of the propeller central hub 38 which is inserted on the shaft 66 and captured between the upstream and downstream hubs 64, 60. The electric propulsion motor further includes annular cowling members 68, 70 disposed at the respective inlet and outlet ends 26, 28 of the stator housing 12 and attached to the respective outer rims 46, 54 of the support structure end portions 42, 44. The cowling members 68, 70 are tapered in cross-section so as to lower flow resistance of the opposite upstream and downstream faces of the stator housing 12 at the inlet and outlet ends of the passage 24. As seen in FIGS. 2, 3 and 5, there is also a cowling member 71 attached to the downstream end of the downstream hub 60.

The electric propulsion motor 10 further includes a cylindrical bearing 72 disposed about the shaft 66 of the support structure axial portion 62 within the opening 32 of the rotor housing 14. The bearing 72 is captured between the upstream and downstream hubs 64, 60 and between the exterior of the support structure axial portion shaft 66 and the interior of the central hub 38 of the propeller 16. In such position, the bearing 72 mounts the propeller 16 and rotor housing 14 rigidly attached thereto for rotation about the shaft 66 and relative to the support structure 18 and the stator housing 12.

Besides providing a support shaft for the rotor housing 14 and propeller 16 and means for attaching the stator housing 12 to a marine vehicle, the support structure 18 also provides a means for routing electrical power conductor leads or cables 74 from the stator housing 12 to the exterior of the motor 10 for connection to a source of electrical power on the vehicle. More particularly, the cables 74 are connected to the stator windings 22 in the stator housing 12 and emanate from the downstream face thereof and then run through the hollow vanes 58 of the downstream end portion 44 of the support structure 18. From the vanes 58, the cables 74 run through the hollow hubs 60, 64 and shaft 66 of axial portion 62 of the support structure 18 to the upstream end of the motor 10 where they emerge through a central bore 76 formed in the flange 52. Preferably, the electrical cables 74 are enclosed in plastic tubing and the tubing is filled with transformer oil, the same as the stator housing 12, to also enhance heat transfer therefrom to the fluid in which the motor 10 is submerged.

The electric propulsion motor 10 just described is submersible and mountable in an outboard relationship to a marine vehicle. The motor 10 is of a high pole order and operable by high frequency alternating current. The submersible outboard motor 10 has a low noise signature and high power density, and employs direct sea water cooling. The motor 10 also requires no gears and will allow highly flexible arrangements for electric vehicle propulsion. Further, the motor is capable of variable direction thrust and deep depth operation.

FIGS. 6-12 illustrate various applications of the electric propulsion motor 10 at different locations on the same marine vessel or on different vessels.

Figure 6:
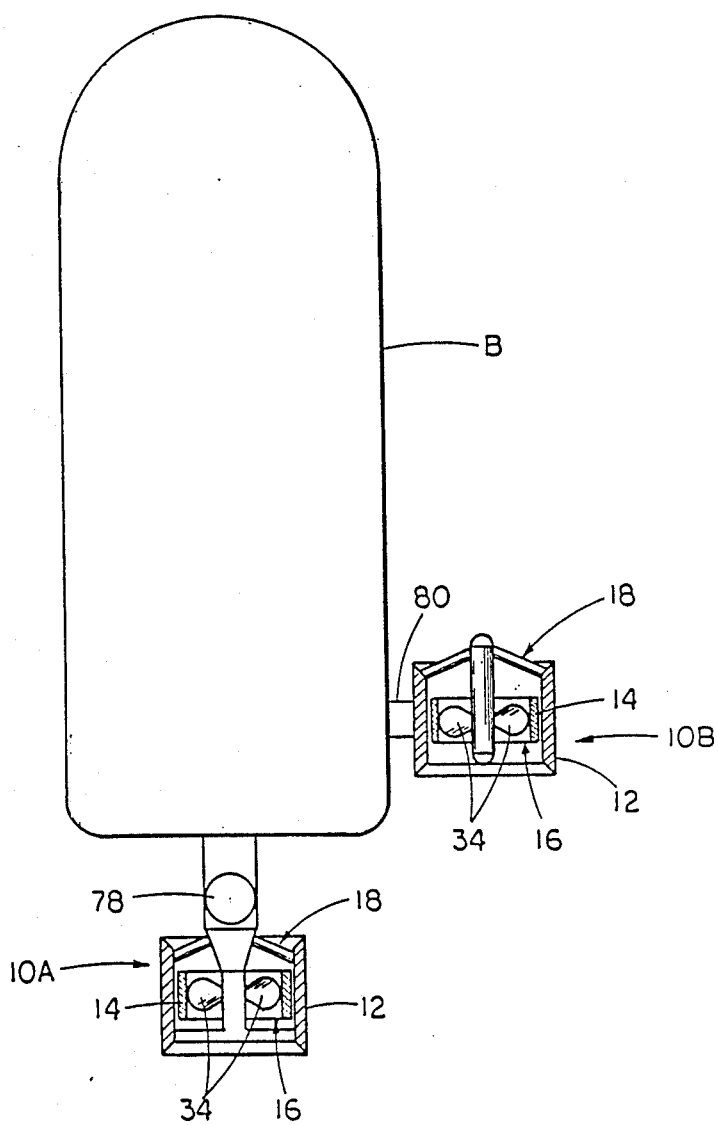
FIGS. 6–12 illustrate different possible applications of the submersible electric propulsion motor of the present invention.

In FIG. 6, motors 10A and 10B are shown in respective end mount and side mount relations on a boat B. In the end mount relation, the upstream flange 52 on the support structure 18 is used for attachment of the motor to the gimbal structure 78. The end-mounted motor 10A can be pivoted about a vertical axis. In the side mount relation, an attachment structure 80 connects the stator housing 12 of the motor 10B to the boat B. The side-mounted motor 10B can be pivoted about a horizontal axis. The downstream vanes 58 can be eliminated in the side-mounted motor 10B since the cables 74 would run through the attachment structure 80.

Figure 7:
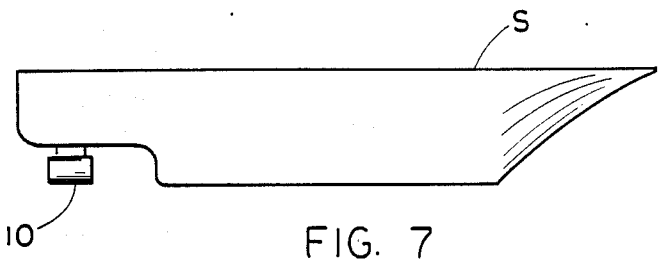
Figure 8:
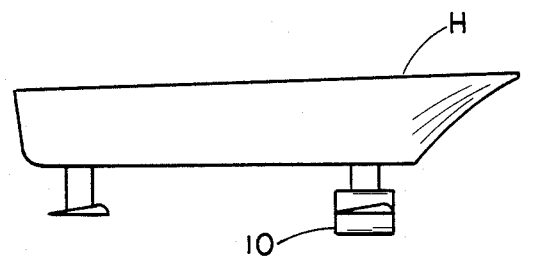
Figure 9:
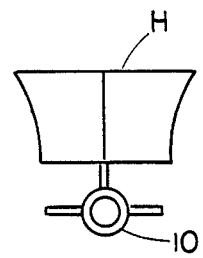
Figure 10:
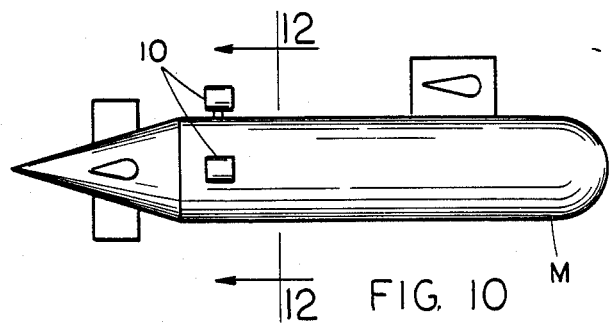
Figure 12:
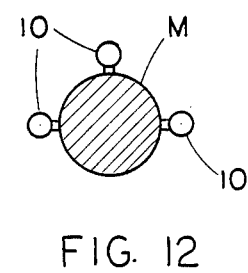
Figure 11:
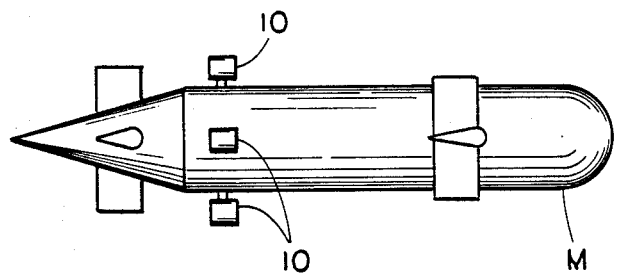

FIG. 7 shows the motor 10 attached at its upper side in gimballed relation below the hull of a ship S. FIGS. 8 and 9 show the motor 10 similarly attached to a hydrofoil H or other semi-submerged Vessel. FIGS. 10-12 show a plurality of the motors similarly mounted to the hull of a submarine M.

It should also be understood that although a sealed rotor housing has been described, experimentation has shown that it is not an essential component and that the rotor core can be used by itself without a sealed housing.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A submersible electric propulsion motor, comprising:
   (a) a sealed annular stator housing enclosing an annular stator core and windings and defining a central fluid flow passage therethrough being circumscribed by said stator housing and having opposite flow inlet and outlet ends;
   (b) an annular rotor core being disposed within said passage of said stator housings such that said stator housing circumscribes said rotor core, said rotor core defining a center fluid flow opening therethrough communicating with said inlet and outlet ends of said passage of said stator housing;
   (c) a propulsion propeller having a plurality of blades and a central annular hub, said propeller being disposed within and across said opening of said rotor core and rigidly connected at its periphery to said rotor core;
   (d) a rigid support structure having an end portion disposed at one of said inlet and outlet ends of said passage and rigidly attached to said stator housing and including a plurality of elongated vanes arranged in a spider-like configuration and extending generally radially inward therefrom, said support structure also including an axial portion rigidly attached to said end portion and extending therefrom axially through said stator housing passage and rotor core opening, said hub of said propeller being mounted to said axial portion so as to mount said propeller and rotor core attached thereto for rotation relative to said stator housing; and
   (e) electrical power conductor leads connected to said stator windings in said stator housing and emanating therefrom through the interior of at least one of said vanes of said end portion of said support structure and therefrom through the interior of said axial portion of said support structure to the exterior of said motor for connection to a source of electrical power.

2. The motor as recited in claim 1, further comprising:
   (f) a vehicle attachment flange defined on said support structure at the location of rigid attachment of said end portion to said axial portion thereof.

3. The motor as recited in claim 2, wherein said attachment flange has a bore defined therein through which said conductor leads emanate from said support structure to the exterior of said motor.

4. The motor as recited in claim 1, further comprising:
   (f) an annular cowling member disposed at and attached to said inlet end of said stator housing.

5. The motor as recited in claim 1, further comprising:
   (f) an annular bearing disposed about said axial portion of said support structure within said opening of said rotor core between said support structure axial portion and said hub of said propeller and mounting said propeller and rotor core rigidly attached thereto for rotation relative to said support structure and said stator housing.

6. The motor as recited in claim 1, further comprising:
   (e) a vehicle attachment member defined on one of said support structure and said stator housing.

7. The motor as recited in claim 1, wherein said sealed stator housing is filled with oil.

8. A submersible electric propulsion motor, comprising:
   (a) a sealed cylindrical stator housing enclosing a cylindrical stator core and windings and defining a central circular fluid flow passage therethrough being circumscribed by said stator housing and having opposite flow inlet and outlet ends;

(b) a cylindrical rotor core being disposed within said passage of said stator housing such that said stator housing circumscribes said rotor core, said rotor core defining a center circular fluid flow opening therethrough communicating with said inlet and outlet ends of said passage of said stator housing;

(c) a propulsion propeller having a plurality of radial blades, a cylindrical peripheral shroud and a central cylindrical hub, said blades extending between and rigidly connected to said shroud and said hub, said propeller being disposed within and across said opening of said rotor core with its shroud being rigidly connected to said rotor core;

(d) a support structure having a end portion disposed at each of said inlet and outlet ends of said passage and rigidly attached to said stator housing and including a plurality of elongated vanes arranged in a spider-like configuration and extending radially inward therefrom, said support structure also including an axial portion extending axially through said stator housing passage and rotor core opening and rigidly attached to said vanes of said end portions at said inlet and outlet ends of said stator housing;

(e) a cylindrical bearing disposed about said axial portion of said support structure within said opening of said rotor core between said support axial portion and said hub of said propeller and mounting said propeller and rotor core rigidly attached thereto for rotation relative to said support structure and said stator housing;

(f) electrical power conductor leads connected to said stator windings in said stator housing and emanating therefrom and through the interior of at least one of said vanes of said end portion of said support structure at said outlet end of said stator housing and therefrom through the interior of said axial portion from said end portion of said support structure at said outlet end to said end portion thereof at said inlet end and therefrom to the exterior of said electric propulsion motor for connection to a source of electrical power; and (g) a vehicle attachment flange defined on said support structure at the location of rigid attachment of said axial portion thereof to the one of said end portions thereof at said inlet end of said stator housing, said flange having a bore defined therein through which said conductor leads emanate from said axial portion of said support structure to the exterior of said motor.

9. The motor as recited in claim 8, further comprising:

(g) an annular cowling member disposed at and attached to each of said inlet and outlet ends of said stator housing.

10. The motor as recited in claim 8, wherein said sealed stator housing is filled with oil.

* * * * *